US007360812B2

(12) United States Patent
Ionescu

(10) Patent No.: US 7,360,812 B2
(45) Date of Patent: Apr. 22, 2008

(54) AUTOMATIC DEVICE, EQUIPMENT AND METHODS FOR HANDLING OBJECTS

(76) Inventor: Anton Vasile Ionescu, 24104 Park St., Hayward, CA (US) 94544

( * ) Notice: Subject to any disclaimer, the term of this patent is extended or adjusted under 35 U.S.C. 154(b) by 207 days.

(21) Appl. No.: 11/090,482

(22) Filed: Mar. 26, 2005

(65) Prior Publication Data

US 2005/0214106 A1    Sep. 29, 2005

Related U.S. Application Data

(60) Provisional application No. 60/556,857, filed on Mar. 27, 2004.

(51) Int. Cl.
*B66C 1/00* (2006.01)
(52) U.S. Cl. .................. 294/27.1; 294/34; 294/100
(58) Field of Classification Search ............... 294/27.1, 294/34, 100
See application file for complete search history.

(56) References Cited

U.S. PATENT DOCUMENTS

| | | | | |
|---|---|---|---|---|
| 4,173,368 A | * | 11/1979 | Haverbusch | .................. 294/88 |
| 4,245,941 A | | 1/1981 | Charonnat | |
| 4,253,695 A | | 3/1981 | Blaive et al. | |
| 4,411,576 A | | 10/1983 | Smith et al. | |
| 4,604,024 A | * | 8/1986 | Edwards et al. | ............. 414/592 |
| 4,676,710 A | | 6/1987 | Shiraishi | |
| 5,158,331 A | * | 10/1992 | Wesselski et al. | ............. 294/94 |
| 5,165,340 A | | 11/1992 | Karlyn et al. | |
| 5,195,794 A | * | 3/1993 | Hummel et al. | ............... 294/94 |
| 5,275,424 A | | 1/1994 | Watanabe | |
| 5,503,446 A | | 4/1996 | De Jong | |
| 5,542,526 A | * | 8/1996 | Wurgler | .................... 198/803.7 |
| 5,698,030 A | | 12/1997 | Rubenchik | |
| 5,713,618 A | * | 2/1998 | Kocsis | ......................... 294/93 |
| 5,797,639 A | | 8/1998 | Zorzenon | |
| 5,873,692 A | | 2/1999 | Costas | |
| 5,897,153 A | | 4/1999 | Philipps et al. | |
| 5,946,216 A | | 8/1999 | Hollerich | |
| 5,997,204 A | | 12/1999 | Ducrocq | |
| 6,111,847 A | | 8/2000 | Assadian | |
| 6,141,298 A | | 10/2000 | Miller | |
| 6,220,640 B1 | | 4/2001 | Jensen et al. | |
| 6,257,636 B1 | | 7/2001 | Hovis et al. | |
| 6,321,649 B1 | | 11/2001 | Vangen et al. | |
| 6,532,198 B1 | | 3/2003 | Miller | |
| 6,547,296 B1 | | 4/2003 | Perkitny et al. | |
| 6,848,113 B2 | * | 1/2005 | Klein | ........................ 720/619 |

OTHER PUBLICATIONS

International Searching Authority (ISA/US), International Search Report for PCT International App. No. PCT/US05/34247, International Publication No. WO 2007/040491 A1, 2 pages.

* cited by examiner

*Primary Examiner*—Mark A. Deuble
(74) *Attorney, Agent, or Firm*—Law Office of Andrei D. Popovici, P.C.

(57) ABSTRACT

An automatic device for handling objects comprises gripper blades attached to a guide, an actuator connected to an external connection transporting the device, and a switching mechanism. The switching mechanism alternately changes the state of the pickup device between object-engaging and object-disengaging states each time the guide reaches an end-of-travel position at an object holder. A single external axial movement is performed for both transporting the pickup device and actuating the switch and the grippers. The pickup device may include radially-gliding pierced grippers crossed by curved arms attached to the axially moving actuator. The described devices and methods may be used in object-handling robots, in particular for CD/DVD handling applications.

9 Claims, 5 Drawing Sheets

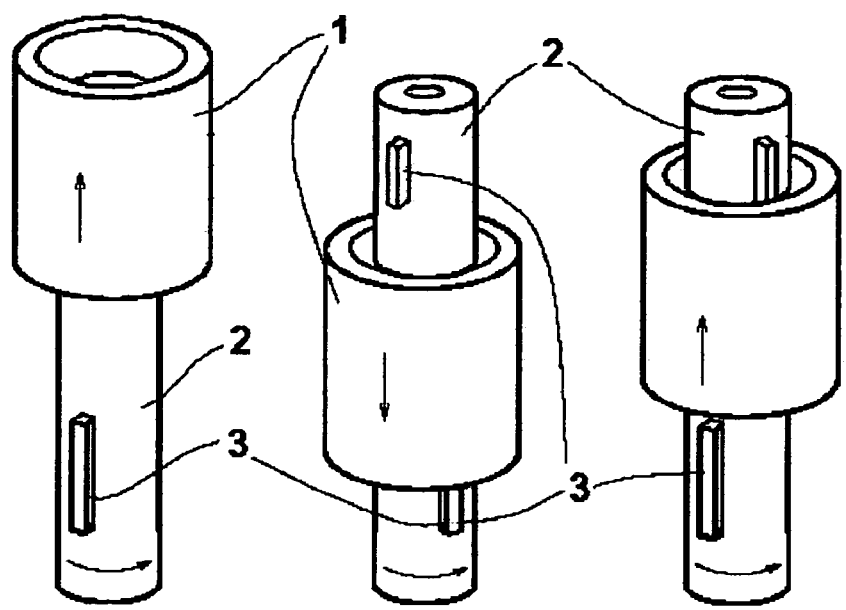
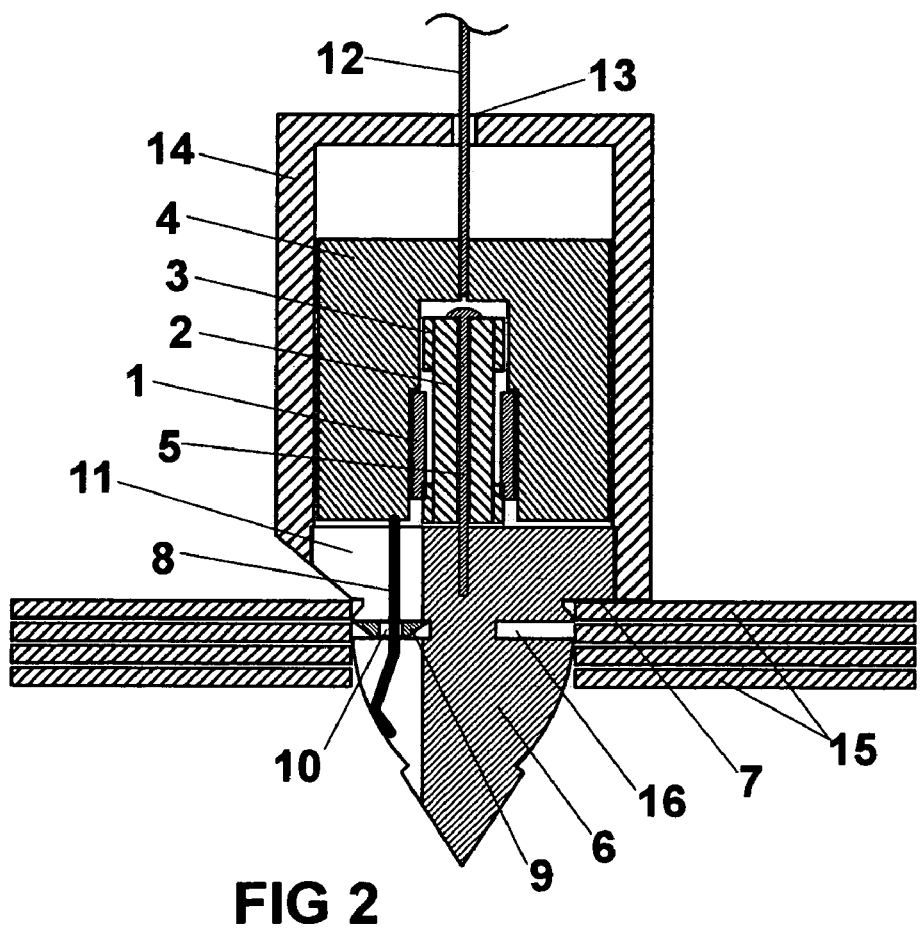

AUTOMATIC DEVICE, EQUIPMENT AND METHODS FOR HANDLING OBJECTS

CROSS-REFERENCE TO RELATED APPLICATIONS

This application claims the benefit of U.S. Provisional patent application Ser. No. 60/556,857 filed Mar. 27, 2004.

BACKGROUND OF THE INVENTION

The invention relates to automated devices and equipment for handling objects, and in particular to devices and equipment used for handling information-storage medium objects such as compact discs.

Many technologies require objects to be automatically and repetitively transported to/from specified locations in order to be processed. A wide diversity of pick-up devices and specialized equipment for transporting and processing such objects has been developed during the last two decades within the media industry, for processing of recordable information carriers like CD and DVD.

Some existing solutions may be too complex or otherwise inappropriate for applications where high precision is needed in order to separate thin stacked objects, such as CDs or DVDs. In addition, some CD/DVD processing systems do not allow a horizontal disk to be vertically placed directly into a processing unit tray, particularly if a part of the circular disk holder is masked by the front cover of the equipment.

SUMMARY

According to one aspect, a pickup device comprises a guide sized to engage an object; a radially-retractable gripping blade housed inside the guide when the gripping blade is in a retracted position and extending radially outside the guide when the gripping blade is in an extended position to contact the object, the gripping blade comprising an axial driving-arm hole; and a curved driving arm passing through the axial driving-arm hole, wherein axially moving the driving arm through the axial driving-arm hole radially moves the gripping blade between the extended position and the retracted position.

According to another aspect, an automated method of transporting an information-encoding disk to/from a horizontal tray of a processing unit comprises: causing the disk to incline towards the processing unit by vertically lifting the disk from the horizontal tray by applying a vertical lifting force to the disk at an off-center engagement location along the disk; maintaining the disk in an inclined position towards the processing unit during a vertical travel to/from such the horizontal tray; and causing the disk to guide into the tray from the inclined position to a final horizontal position by vertically delivering the disk into the horizontal tray.

According to another aspect, an automatic pickup device for gripping, holding and releasing an object comprises: a guide having a stopping shoulder shaped to be placed against the object; and actuator axially movable with respect to the guide; a mechanical switch that alternately changes a state of the pickup device between an object-engaging state and an object-disengaging state when the pickup device is at an end-of-travel position at an object holder, the mechanical switch being triggered by an axial movement of the actuator relative to the guide when the guide is stopped at the object holder, the mechanical switch including a first component rigidly attached to the actuator and a second component connected to the guide; and a gripper connected to the guide and actuated by the axial movement of the actuator with respect to the guide, the gripper gripping the object when the pickup device is in the object-engaging state and not gripping the object when the pickup device is in the object-disengaging state.

According to another aspect, an object-transporting robot comprises an automatic pickup device, and a flexible vertical connection coupled to the automatic pickup device, wherein the pickup device hangs gravitationally from the flexible vertical connection.

BRIEF DESCRIPTION OF THE DRAWINGS

FIGS. 1A-C show perspective views of a switching mechanism in different states.

FIG. 2 shows a side cross-sectional view of a pickup device placed against stacked objects (e.g. disks), according to some embodiments of the present invention.

DESCRIPTION

Figure 3:
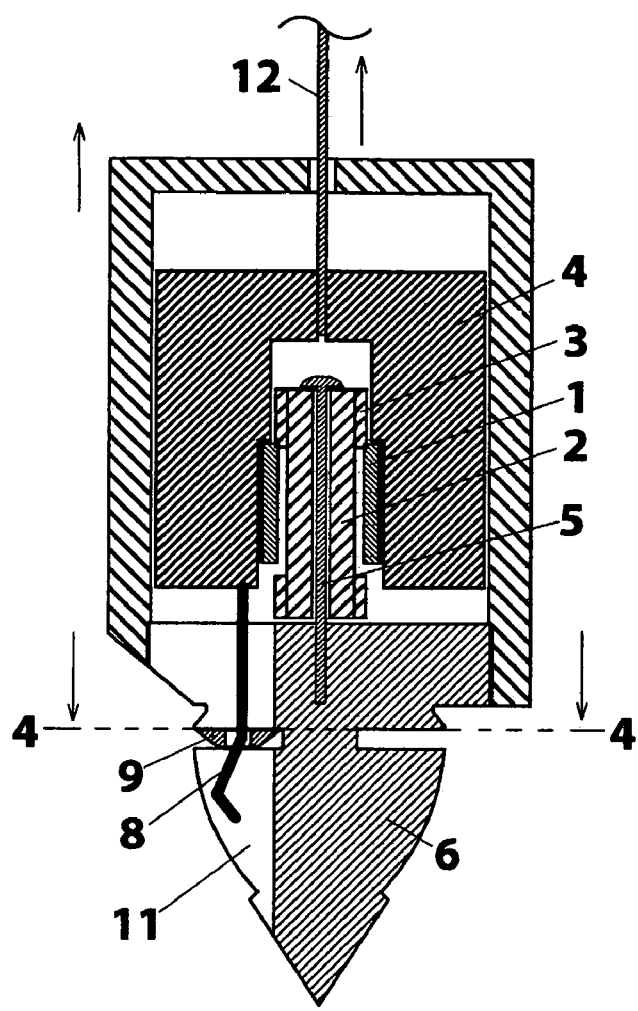
FIG. 3 shows a side cross-sectional view of the pickup device of FIG. 2 in an object-disengaged state, according to some embodiments of the present invention.

A number of technologies allow automatically and repetitively transporting objects to/from specified locations in order to be processed. A pickup device commonly alternately picks-up an object from a source location and releases it at a destination location.

The present invention discloses pickup devices and methods for sequentially gripping, holding and releasing multiple similar objects such as compact discs. According to some embodiments, a pickup device is capable of alternately switching between object engaging/disengaging states by itself, using a self-contained switching mechanism automatically triggered each time the device reaches an end-of-travel position. The device may use a single external axial movement for both transporting the pickup device towards the object holder and engaging/disengaging the object, thus simplifying the device and decreasing its cost.

According to some embodiments, a pickup device comprises a guiding element with a stopping shoulder enabling self-adjustment to an optimal position when placed against the object. A set of grippers are secured to the guiding element, and are capable of establishing contact with the object. When engaging the object, the grippers are actuated before the guiding element starts moving. This feature enables gripping precision, which may be desirable especially when working with stacked objects to be separated.

According to some embodiments, pierced gripping blades housed inside the guiding element are penetrated by thin curved arms rigidly attached to an actuator. The actuator is connected to external transport means, and is capable of axially moving with respect to the guiding element within a short travel range. The arms move axially together with the actuator and glide through the holes of the gripping blades, forcing the protrusive grippers to radially glide out their housing to engage the object, or respectively retract inside the guiding element to release the object, according to the pickup device status. These features allow error free operation of the pickup device, and allow a single external action to both axially transport the pickup device and actuate the grippers. When appropriate, the grippers may glide under the object, supporting it from beneath. Using the grippers to support the object from underneath secures the object during transport and relieves the arms from tension.

According to some embodiments, a pickup device may use a two-component switching mechanism similar to ones used by retractable ball-point pens. For a description of an exemplary switching mechanism see for example U.S. Pat. No. 5,997,204. Using such a switching mechanism allows simplifying the device construction. In such a switching mechanism, one component of the switching mechanism is rigidly attached to an actuator so the component and the actuator move together axially when driven by a transport means. A second component of the switching mechanism is attached to a guiding element by a retaining pin and allowed to spin around a common axis, but not to move away axially.

According to some embodiments, for applications in which objects are to be lifted, a hanging picker can be vertically ascended and descended using flexible means such as thread, wire, flexible ribbon or tape. Using a flexible connection removes the need for a vertical traveling supporting arm, or for a frame or vertical shaft for the picker to travel along. The object handling robot becomes very simple and small, allowing though long vertical travel for the picker, said large automated processing capacity.

Figure 7:
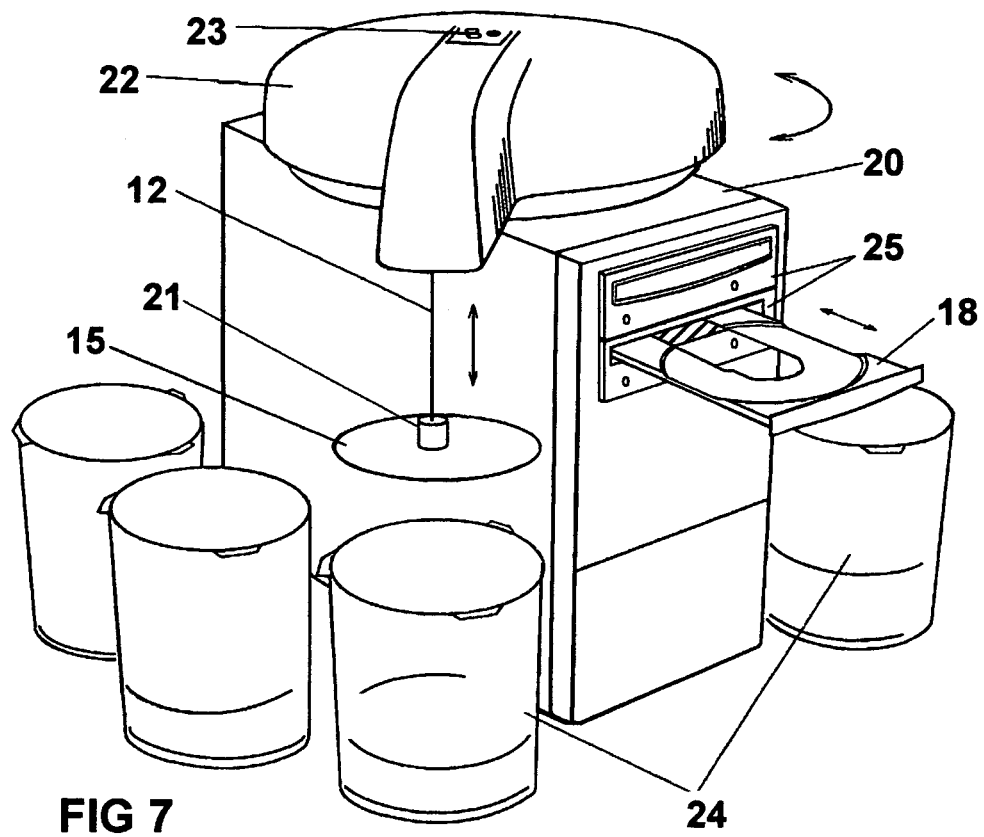
FIG. 7 shows a perspective view of a robot according to some embodiments of the present invention.

A versatile robot as described herein may be used to automate a wide variety of CD/DVD master processing equipment by placing the robot above the master processing equipment. The disks (e.g. CD or DVD) are vertically stacked and delivered to/from retainers located under the surface supporting the robot, and accessed from above. One exemplary embodiment using such a configuration is shown in FIG. 7. Depending on the number of disks to be processed, a user can choose the number and positions of the disk retainers to be used during each automated processing cycle. The disk retainers may be positioned at selected locations using a simple, fast and effective procedure. Such a procedure may use the robot to deliver a positioning device to a selected location. Subsequently, a user transfers a retainer over the positioning device and takes the positioning device away (see FIGS. 9-A-C).

Figure 5:
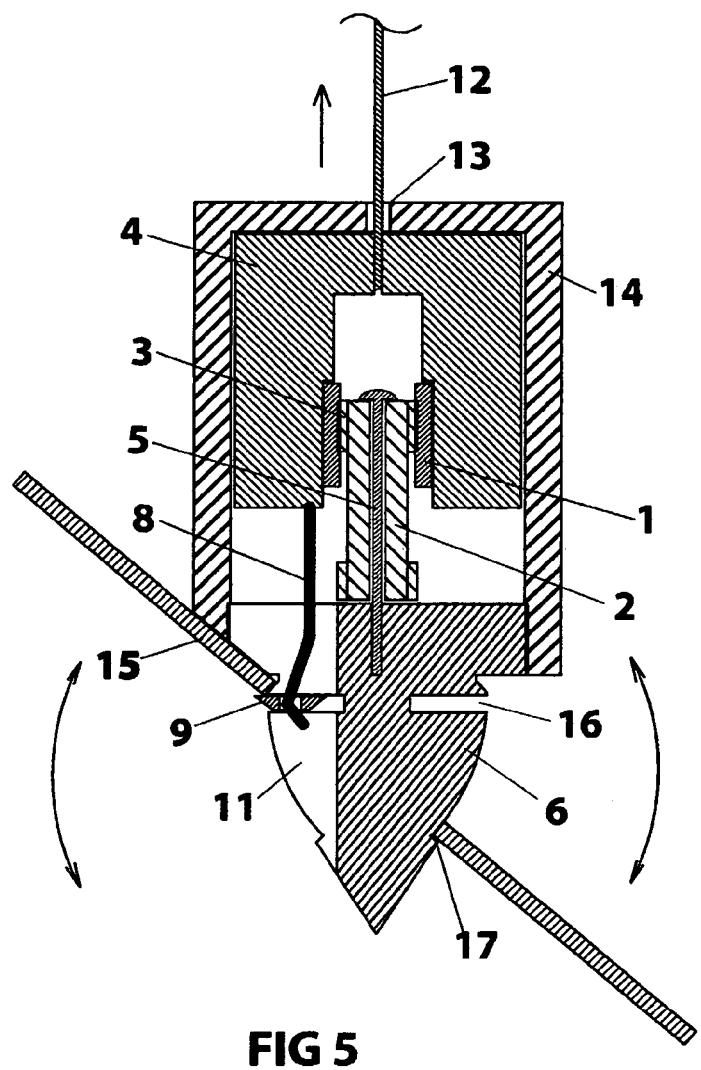
FIG. 5 shows a side cross-sectional view of the pickup device of FIGS. 2-3 in an object-engaged state with an inclined disk, according to some embodiments of the present invention.
Figure 6A:
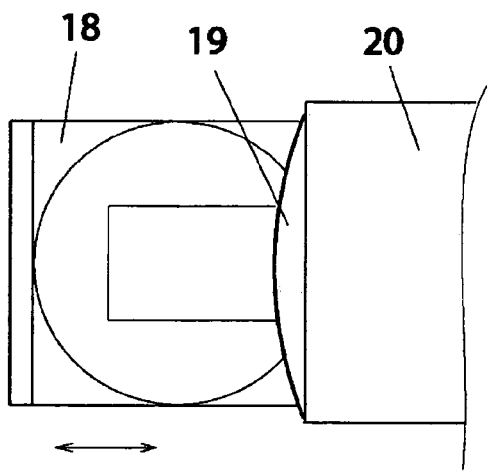
FIGS. 6A-B show schematic views of a processing unit with a tray having a partially-masked disk-holding area, and of a trajectory of an inclined disk being vertically transported to/from such a tray, respectively, according to some embodiments of the present invention.

Some existing CD/DVD processing equipment does not allow a horizontal disk to be vertically placed directly into a processing unit tray, particularly if a part of a circular disk holder area is masked by a front cover of the equipment (see FIG. 6A). A method and corresponding embodiment are disclosed wherein the disk is inclined toward the processing equipment when lifted from its horizontal tray by a vertically-moving pickup device, and glides into the tray from its inclined position to a final horizontal position when vertically delivered by the picking device into the tray, allowing automatic loading/unloading disks into such processing equipment (see FIGS. 5 and 6A-B).

According to some embodiments, a pickup device for gripping, holding and releasing similar objects such as compact discs does not require any additional external actuation for gripping the object. The pickup device is able to alternately switch between object engaging/disengaging states by itself, by means of a self contained switching mechanism, automatically triggered each time the device reaches an end-of-travel position with respect to an object holder. For ease of description the various handled objects will be referred hereinafter as "disks". For simplicity, in the preferred embodiments described, the object holders are horizontal, the disks are vertically stacked and the pickup device moves vertically along the axis of the object holder in order to engage or disengage a disk, being subsequently transported above a different location.

According to some embodiments, many types of known switching mechanisms can be used in a pickup device. Exemplary switching mechanisms include mechanisms similar to those used in some retractable ball-point pens or some push-button electric switches. For simplicity, the description below focuses on a switching mechanism similar to one described in U.S. Pat. No. 5,997,204. The functioning of the switching mechanism is described briefly below, in order to ease further description of the pickup device itself.

As shown in FIGS. 1A-C, an exemplary switching mechanism comprises two parts: a cylindrical pin 2 having two pairs of diametrically opposed protruding ribs 3 and a cylindrical ring 1 comprising grooves and saw-teething on its inner surface (not shown). Consider the switching mechanism positioned vertically, with pin 2 allowed to rotate. When the ring 1 is axially moved upwards along the central pin 2, the ribs 3 glide on the inclined surface of the teeth, the pin 2 rotates and the ring stops in the position shown in FIG. 1A, when the upper ribs 3 reach the deepest points of the current saw-teeth grooves so the ring 1 grips the pin 2. The position shown in FIG. 1A corresponds to a disk-engaged state in the description below. When the ring 1 is axially moved downward (in the opposite direction), the other pair of ribs 3 glides on the saw-teething on the other side of the ring 1, the pin 2 rotates and the ring 1 stops in the position shown in FIG. 1B, when the ribs 3 reach the deepest points of the current saw-teeth. The position shown in FIG. 1B is referred to below as a switching position. When subsequently the ring 1 is moved upward again, the process repeats, but the ring 1 will grip the pin 2 and stop after a shorter vertical travel, as shown in FIG. 1C, due to the different shape of the corresponding saw-teeth. The position shown in FIG. 1C corresponds to a disk-disengaged state in the description below. The device transitions in sequence between disk-engaged, switching, and disk-disengaged states, and vice-versa.

As shown in FIG. 2, a picking device includes a guiding element 6 having a stopping shoulder 7. Stopping shoulder 7 enables the picking device to self-adjust its position to an optimum when placed against an object 15. Object 15 may be a disk. A central pin 5 connects the guiding element 6 with the pin 2, which forms part of the switching mechanism of FIGS. 1A-C, allowing pin 2 to spin around a common central axis.

An actuator 4 is attached to an external axial movement means (transport means, or transport connection) 12, by which the entire pickup device is transported. Transport connection 12 may include a flexible connection formed by thread, wire, flexible ribbon or tape. Actuator 4 comprises a central cylindrical bore that houses the ring 1, which forms part of the switching mechanism of FIGS. 1A-C. The ring 1 is rigidly attached to the actuator 4.

Each time the guiding element 6 stops on an object holder, the actuator 4 continues its axial movement until eventually actuator 4 gets closest to the guiding element 6, when the mechanism reaches its switching position. Transport connection 12 is used to pull actuator 4 away from guiding element 6. Actuator 4 moves away from guiding element 6 up to a maximum distance between actuator 4 and guiding element 6, and subsequently pulls guiding element 6 along. The maximum distance between actuator 4 and guiding element 6 depends on the current state of the switching mechanism, and alternates between a short and along travel distance. The picking device alternates between object-engaging and object-disengaging states.

One or more grippers 9 are actuated by the motion of actuator 4 with respect to guiding element 6. Grippers 9 may include gripping blades having sharp outer edges. Grippers 9 are secured to the guiding element 6. When guiding element 6 engages an object 15, grippers 9 are actuated before guiding element 6 starts moving. Actuating grippers 9 before guiding element 6 starts moving improves the gripping precision, which facilitates the separation of stacked objects 15.

Grippers 9 are housed in one or more recesses 16. When actuated, grippers 9 protrude out of recesses 16. In some embodiments, the axial distance between the stopping shoulder 7 and the sharp edges of grippers 9 is slightly bigger than the thickness of each object 15, allowing grippers 9 to grasp one object 15 from beneath when grippers 9 are actuated.

Grippers 9 comprise holes 10 for receiving thin curved arms 8. Each curved arm 8 passes through a corresponding hole 10. Arms 8 are rigidly attached to actuator 4. Guiding element 6 has thin radial ditches (channels) 11 (shown also in FIGS. 4A-B) allowing the arms 8 to travel freely when the actuator 4 moves axially against guiding element 6. A dust-protective frame 14 may be rigidly attached to the guiding element 6. Frame 14 allows room for the actuator 4 to move axially with respect to the guiding element 6 within its entire travel range. Frame 14 comprises a hole 13 along the top of frame 14, opposite guiding element 6, for allowing the transport connection 12 to pass through.

When the actuator 4 is axially pulled away from the guiding element 6 by the transport connection 12, the arms 8 glide along the channels 11 and through the holes 10 of the pierced blades 9. If the pickup mechanism is in a disk-engaged state, the switching mechanism allows element 4 to rise sufficiently, and arms 8 push the grippers 9 to glide out of their recesses 16. Guiding element 6 starts moving together with actuator 4, and the entire picking device 21 (see FIG. 7) is moved by transport connection 12.

Figure 4A:
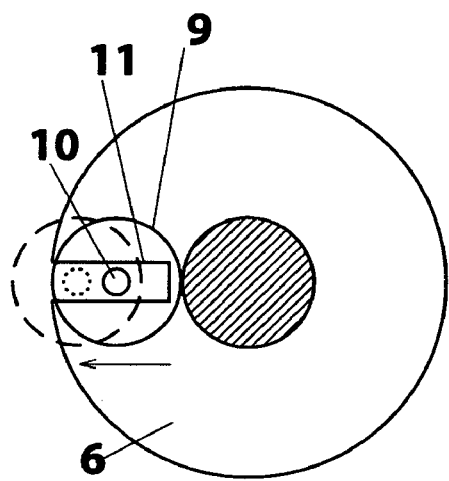
FIGS. 4A-B show top cross-sectional views of a guiding element along a gripper housing plane, according to some embodiments of the present invention.
Figure 4B:
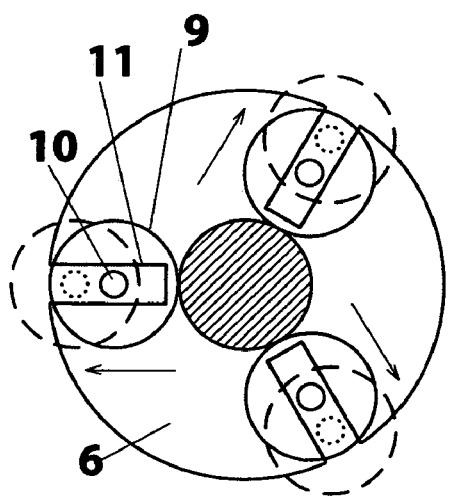
Figure 8:
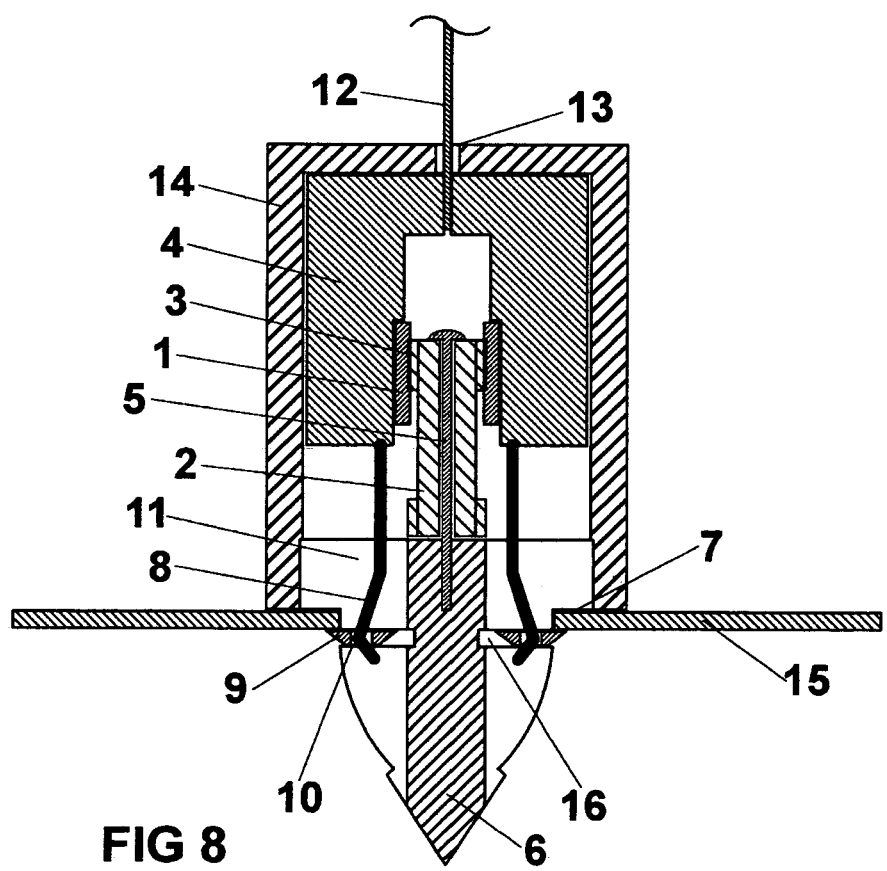
FIG. 8 shows a cross-sectional view of the pickup device of FIGS. 2-3 in an object-engaged state with a horizontal disk, according to some embodiments of the present invention.

Consider a picking device placed against a stack of disks 15 as shown in FIG. 2, with the shoulder 7 laying on the top disk 15, and the mechanism in the switching position shown in FIG. 1B. The actuator 4 is closest to the guiding element 6, and the arms 8 keep the gripping blades 9 completely retracted inside their recesses 16. If the picking device was in a disk-disengaged state when placed against the stack of disks 15, the picking device will engage a disk 15 the next time the picking device is lifted from the stack of disks 15. When the transport connection 12 axially pulls actuator 4 away from the guiding element 6, which rests resting on a disk 15 underneath, the arms 8 glide through the holes 10 of the pierced grippers 9 and push grippers 9 to glide out of the guiding element 6. The sharp edges of grippers 9 then protrude under the first disk 15 in the stack. Subsequently, the guiding element 6 starts moving together with the actuator 4. The entire pickup device 21 (FIG. 7) is lifted by transport connection 12, and carries away the engaged disk 15, as shown in FIG. 5. The sectional views in FIGS. 4A-B show the radial movement of the grippers 9 in two possible embodiments, with a single gripping blade and respectively with more gripping blades. FIG. 8 shows an embodiment of the pickup device having multiple grippers 9 in a disk-engaged state. In the embodiment shown in FIG. 8, a picked disk 15 keeps its horizontal position during transport.

Consider now an engaged disk 15 transported to be released at a new location. The transport connection 12 vertically lowers the pickup device at the location of interest. When the disk 15 reaches a disk holder, the guiding element 6 stops with its shoulder 7 laying on the disk. The actuator 4 continues its movement, approaching the guiding element 6. The arms 8 glide through the holes 10 of the pierced grippers 9, forcing grippers 9 to retract completely inside the guiding element 6. The movement stops when the actuator 4 reaches its lowest position, closest to the guiding element 6. The pickup device is then in a switching position, shown in FIG. 2.

The next lifting will occur with the pickup device in a disk-disengaging state. Actuator 4 grips the guiding element 6 after a short travel, before the arms 8 start pushing the grippers 9 out, so the grippers 9 will not protrude out of the guiding element 6. The pickup device 21 (FIG. 7), lifted by transport connection 12, leaves unloaded as shown in FIG. 3, and the previously-delivered disk 15 remains in its holder.

The cycle described above may be repeated multiple times. The pickup device 21 alternates between disk-engaged and disk-disengaged states each time pickup device 21 reaches the down-end-of-travel position at an object holder.

In some embodiments, if the pickup device 21 moves vertically towards the disk holder in order to engage or disengage a disk 15, the pickup device 21 can hang gravitationally. Pickup device 21 may be ascended/descended using a flexible transport connection 12 including thread, wire, flexible ribbon or tape. A solution using a flexible connection 12 allows simplifying the automation equipment, since there is no need for a vertical traveling arm, or for a frame or vertical shaft for the picker to travel along. Moreover, using a flexible connection allows achieving relatively long vertical travel for the pickup device, which in turns allows achieving large handling capacities for a relatively small and flat disk handling robot. The transport connection 12 being simply coiled on a reel inside the robot and guided out on a pulley attached to a horizontally-moving part of the robot. The pickup device 21 is lifted up to its highest position where a generally-cylindrical holder under the pulley houses pickup device 21. The cylindrical holder maintains the vertical position of pickup device 21 and prevents pickup device 21 from waggling during a horizontal movement from a disk holder to another.

As shown in FIG. 7, the robot may be positioned in such a way that it can access from above the disk holders of interest. The disk holders of interest may include the trays of the disk processing equipment and retainers holding stacks of processed/unprocessed disks. A robot 22 is placed over a disk processing master equipment 20. Master equipment 20 comprises processing units 25 provided with trays 18. Requests for disk changing may be sent to the robot 22 by the master equipment 20 whenever needed, for example via a RS232 interface. Disk retainers 24 for the disk stacks are placed on a table around the master equipment 20 served by the robot 22. The robot 22 may comprise a keyboard 23 for interfacing with a human operator. Depending on the number of disks to be processed, a user can choose the number and the positions of the disk retainers 24 to be used during each automated processing cycle. Once a configuration is selected, the user places the disk retainers 24 on the table, precisely at the locations to be accessed by the robot 22.

Figure 9A:
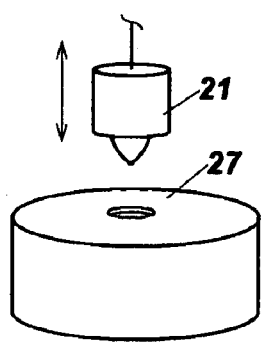
FIGS. 9A-C show a sequence for positioning a stack retainer, including: delivering a positioning device to a selected location (FIG. 9A), transferring a retainer over the positioning device (FIG. 9B), and taking the positioning device away (FIG. 9C), according to some embodiments of the present invention.
Figure 9B:
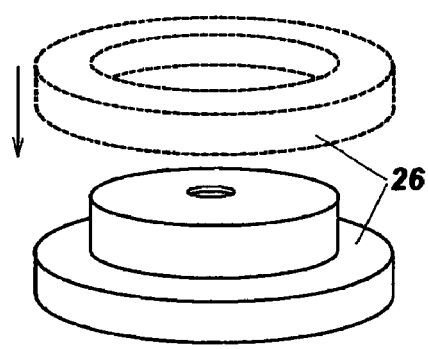
Figure 9C:
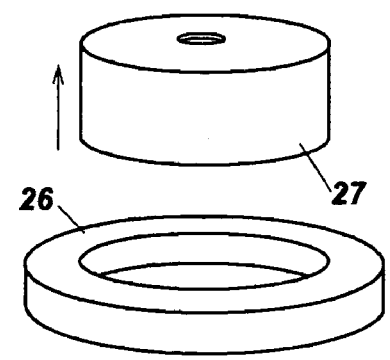

The following procedure may be repeated for each disk retainer 24 to be positioned at a desired location:

a user selects the desired location using the keyboard 23, and places on the tray 18 a positioning device 27 (FIG. 9A); positioning device 27 may be generally-cylindrically shaped and hollow, and may include a top cover with a central hole similar to a regular disk to be picked up, so the robot can handle positioning device 27 like an ordinary disk;

the robot picks up, transports and releases the positioning device 27 on the table to the selected location; then the pickup device 21 ascends into its housing, as illustrated by the arrow in FIG. 9A;

the user transfers a supporting device 26 (FIG. 9B) over the positioning device 27 so located; supporting device 26 may be generally ring-shaped, and may comprise an opening that fits the outer size of the positioning device 27 so that supporting device 26 surrounds the positioning device 27 and attaches to the table, for example by self sticking means;

the user takes away the positioning device 27 (FIG. 9C) and places a disk retainer over the supporting device 26 so fixed on the table; the bottom shape of the disk retainer mates the shape of the supporting device 26 so that the disk retainer cannot move horizontally; for CDs or DVDs, the original plastic cylindrical covers of regular commercial disk spindle packages can be used as disk retainers.

Figure 6B:
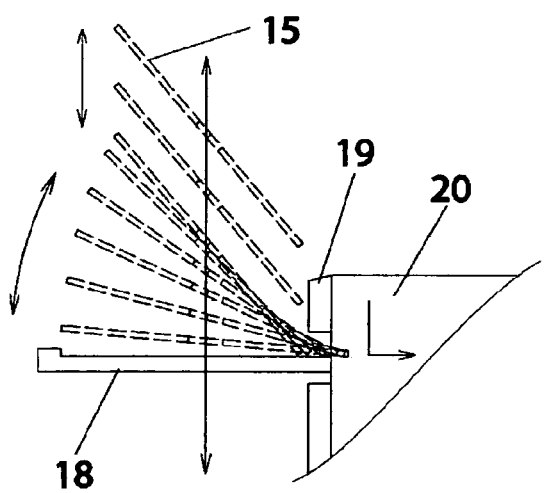

As illustrated in FIG. 6A, some current CD/DVD processing equipment does not allow a horizontal disk to be vertically placed directly into a tray 18 of a processing unit (FIG. 6A), since a part of the circular disk holder area is masked by a front cover 19 of the equipment. As shown in FIG. 6B, a disk 15 may be transported to/from and delivered into the tray 18 without interfering with the front cover 19 if the disk is inclined towards the processing equipment during vertical travel along the central axis of the circular disk holder of such a tray. The embodiment of the pickup device shown in FIG. 5 can deliver a disk to/from such a tray as follows: the gripping blade 9 hooks the disk 15 asymmetrically, from the side opposite the equipment. When lifted, the disk 15 inclines towards the processing equipment up to the desired angle, e.g. about 45 degrees, when disk 15 reaches a stopping shoulder 17 on the guiding element 6. Guiding element 6 is shaped to allow the disk 15 to rotate freely while preventing disk 15 from falling. The transport connection 12 does not allow the pickup device to spin around its axis, so the disk 15 maintains its inclined orientation towards the equipment during its vertical travel. As shown in FIG. 6B, when the disk 15 is vertically descended in order to be released into tray 18, the lower edge of disk 15 glides into the tray 18 and the disk 15 rotates from its inclined position to a final horizontal position.

The above embodiments may be altered in many ways without departing from the scope of the invention. Accordingly, the scope of the invention should be determined by the following claims and their legal equivalents.

What is claimed is:

1. A pickup device comprising:
a guide sized to engage an object;
a radially-retractable gripping blade housed inside the guide when the gripping blade is in a retracted position and extending radially outside the guide when the gripping blade is in an extended position to contact the object, the gripping blade comprising an axial driving-arm hole; and
a curved driving arm passing through the axial driving-arm hole, wherein axially moving the driving arm through the axial driving arm hole radially moves the gripping blade between the extended position and the retracted position.

2. The device of claim 1, wherein the object is an information-encoding disk.

3. The device of claim 2, further comprising an axially-movable actuator rigidly attached to the driving arm, for driving an axial motion of the driving arm.

4. The device of claim 3, further comprising a flexible connection coupled to the actuator, for axially lowering and raising the actuator to drive the axial motion of the driving arm.

5. The device of claim 4, wherein the flexible connection is formed by a flexible wire, thread, ribbon or tape.

6. The device of claim 1, comprising a plurality of radially-retractable gripping blades coupled to the guide, the plurality of gripping blades comprising a corresponding plurality of axial driving-arm holes defined therein.

7. The apparatus of claim 1, wherein the guide has a stopping shoulder laying on the object when the guide engages the object, and wherein an axial distance between the stopping shoulder and an outer edge of the gripping blade is slightly bigger than an axial extent of the object, wherein the gripping blade in an extended position grips the object from beneath.

8. An automatic pickup device for gripping, holding and releasing an object, comprising:
a guide having a stopping shoulder shaped to be placed against the object;
an actuator axially movable with respect to the guide;
a mechanical switch that alternately changes a state of the pickup device between an object-engaging state and an object-disengaging state when the pickup device is at an end-of-travel position at an object holder, the mechanical switch being triggered by an axial movement of the actuator relative to the guide when the guide is stopped at the object holder, the mechanical switch including a first component rigidly attached to the actuator and a second component connected to the guide; and
a gripper connected to the guide and actuated by the axial movement of the actuator with respect to the guide, the gripper gripping the object when the pickup device is in the object-engaging state and not gripping the object when the pickup device is in the object-disengaging state.

9. An object-transporting robot comprising:
an automatic pickup device comprising
a guide having a stopping shoulder shaped to be placed against the object;
an actuator axially movable with respect to the guide;
a mechanical switch that alternately changes a state of the pickup device between an object-engaging state and an object-disengaging state when the pickup device is at an end-of-travel position at an object holder, the mechanical switch being triggered by an axial movement of the actuator relative to the guide when the guide is stopped at the object holder, the mechanical switch including a first component rigidly attached to the actuator and a second component connected to the guide; and a gripper connected to the guide and actuated by the axial movement of the actuator with respect to the guide, the gripper gripping the object when the pickup device is in the object-engaging state and not gripping the object when the pickup device is in the object-disengaging state; and a flexible vertical connection coupled to the automatic pickup device, wherein the pickup device hangs gravitationally from the flexible vertical connection.

* * * * *